United States Patent
Kashiwa et al.

(10) Patent No.: US 7,221,311 B2
(45) Date of Patent: May 22, 2007

(54) RADAR

(75) Inventors: Takuo Kashiwa, Nishinomiya (JP); Takayoshi Hirose, Nishinomiya (JP); Akio Funae, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 176 days.

(21) Appl. No.: 11/137,330

(22) Filed: May 26, 2005

(65) Prior Publication Data

US 2005/0264443 A1 Dec. 1, 2005

(30) Foreign Application Priority Data

May 28, 2004 (JP) ............... 2004-159660

(51) Int. Cl.
*G01S 7/28* (2006.01)
(52) U.S. Cl. ...................... 342/193; 342/198
(58) Field of Classification Search ............ 342/70–72, 342/192, 193, 198
See application file for complete search history.

(56) References Cited

U.S. PATENT DOCUMENTS

| | | | | |
|---|---|---|---|---|
| 5,146,227 A | * | 9/1992 | Papadopoulos | 342/20 |
| 5,446,923 A | * | 8/1995 | Martinson et al. | 455/330 |
| 5,570,093 A | * | 10/1996 | Aker et al. | 342/104 |
| 6,037,895 A | * | 3/2000 | Uehara | 342/70 |
| 6,087,979 A | | 7/2000 | Magori et al. | |
| 6,362,777 B1 | * | 3/2002 | Kawakami et al. | 342/131 |
| 2005/0227638 A1 | * | 10/2005 | Suematsu et al. | 455/118 |
| 2005/0264443 A1 | * | 12/2005 | Kashiwa et al. | 342/193 |

FOREIGN PATENT DOCUMENTS

| | | |
|---|---|---|
| DE | 4240492 A1 | 6/1994 |
| EP | 2002/012916 A1 | 2/2002 |
| JP | 11-109025 | 4/1999 |
| JP | WO 200054421 A * | 9/2000 |
| JP | 2002-022823 | 1/2002 |
| WO | WO-00/54421 A1 | 9/2000 |

* cited by examiner

*Primary Examiner*—John B. Sotomayor
(74) *Attorney, Agent, or Firm*—Birch, Stewart, Kolasch & Birch, LLP

(57) ABSTRACT

A radar includes a transmitter circuit, a receiver circuit, an antenna and a circulator. The receiver circuit includes a low-noise amplifier which amplifies a received signal fed from the antenna through the circulator. A local oscillator provided in the receiver circuit generates a local oscillator signal of which frequency is approximately half the frequency of the received signal, and the local oscillator signal is amplified by a buffer amplifier. An even harmonic mixer including an anti-parallel diode pair also provided in the receiver circuit as a frequency converter mixes the received signal output from the low-noise amplifier with the local oscillator signal output from the buffer amplifier to generate and output an intermediate frequency signal.

6 Claims, 7 Drawing Sheets

RADAR

BACKGROUND OF THE INVENTION

1. Field of the Invention

The present invention relates to a radar provided with a transmitter circuit and a receiver circuit for transmitting and receiving radio waves in alternating cycles.

2. Description of the Related Art

In a radar provided with a transmitter circuit and a receiver circuit for alternately transmitting and receiving radio waves in successive cycles, the receiver circuit includes a frequency converter (hereinafter referred to as a mixer) for modulating a very weak echo signal received, or for converting the frequency of the received signal into an intermediate frequency. To convert the received signal into a detectable frequency, the mixer mixes the received signal with an output signal of a local oscillator (or the local oscillator signal), whereby the frequency of the received signal is converted into the intermediate frequency as discussed in Japanese Patent Application Publication No. 2002-22823. Here, the output signal of the local oscillator has a frequency separated from the frequency of the received signal by as much as the intermediate frequency.

The radar provided with the transmitter circuit and the receiver circuit for alternately transmitting and receiving radio waves typically has a single antenna used for transmission and reception. For this reason, this type of radar further includes a circulator which supplies a transmit signal output from the transmitter circuit to the antenna and delivers the received signal fed from the antenna to the receiver circuit. The circulator also serves to prevent the transmit signal output from the transmitter circuit and the output signal of the local oscillator from entering neither the receiver circuit or the transmitter circuit.

However, the aforementioned conventional circulator can not completely prevent leakage of the transmit signal fed from the transmitter circuit into the receiver circuit or of the output signal of the local oscillator from the receiver circuit into the transmitter circuit. Shown in FIG. 7 is a fundamental wave mixer used in a conventional radar. Local oscillator radio frequency (LO-RF) isolation characteristics of the mixer are determined mainly by isolation achieved by a hybrid circuit, so that the level of isolation obtained with the mixer is only about 15 dB. There exist some conventionally known approaches aimed at achieving a higher level of LO-RF isolation. Examples of these approaches are to provide a low-noise amplifier in a preceding stage of a mixer, or to insert a circulator between a transmitter circuit and a receiver circuit. Even with isolation characteristics achieved by such approaches, however, there is a problem that frequency components of the output signal of the local oscillator in the vicinity of the frequency of the received signal are radiated as spurious emissions from the antenna.

In addition, load impedance for the output signal of the local oscillator operating at a frequency close to the received signal tends to change in a conventional mixer circuit when a high-power received signal is input, so that there arises a problem related to frequency pulling.

SUMMARY OF THE INVENTION

The present invention has been made to overcome the aforementioned problems of the prior art. Accordingly, it is an object of the invention to provide a radar in which leakage of an output signal of a local oscillator into other circuits than a mixer can be substantially suppressed.

To achieve the aforementioned object, a radar of the invention includes a transmitter circuit for generating a transmit signal, a receiver circuit for receiving a received signal, an antenna for radiating radio waves produced from the transmit signal and receiving a portion of the radio waves, and a circulator for conveying the transmit signal supplied from the transmitter circuit to the antenna and for conveying the received signal fed from the antenna to the receiver circuit. In this radar of the invention, the receiver circuit includes a local oscillator for generating a local oscillator signal, a buffer amplifier for amplifying the local oscillator signal output from the local oscillator, and an even harmonic mixer for mixing the received signal with the local oscillator signal fed through the buffer amplifier, the even harmonic mixer including an anti-parallel diode pair.

According to the above configuration of the invention, the radar employs an even harmonic mixer including an anti-parallel diode pair as a frequency converter. The frequency of the local oscillator signal is approximately half the frequency of the received signal. Therefore, if two diodes of the even harmonic mixer are perfectly balanced, local oscillator signal frequency components will not leak from the even harmonic mixer. Additionally, the antenna has such frequency characteristics that make it possible to prevent spurious emissions due to leakage of the local oscillator signal, if any.

In the radar of the invention thus configured, the buffer amplifier is provided in a following stage of the local oscillator. Consequently, isolation characteristics of the buffer amplifier prevent frequency pulling of the local oscillator signal due to a change in impedance of the even harmonic mixer which occurs which occurs when a high-power received signal is input into the even harmonic mixer. It is to be pointed out that frequency pulling can be avoided even when an ordinary harmonic mixer is used instead of the even harmonic mixer including an anti-parallel diode pair as a frequency converter.

In one preferable form of the invention, the aforementioned receiver circuit further includes a low-noise amplifier for amplifying the received signal and delivering the amplified received signal to the even harmonic mixer, the low-noise amplifier being provided in a following stage of the circulator.

If the radar is thus configured with the receiver circuit including a low-noise amplifier connected in the following stage of the circulator, isolation characteristics of the low-noise amplifier prevent the local oscillator signal from being radiated as spurious emissions from the antenna.

In another preferable form of the invention, the aforementioned receiver circuit further includes an isolator for conveying the received signal to the even harmonic mixer, the isolator being provided in a following stage of the circulator.

According to this configuration, the receiver circuit includes an isolator connected in the following stage of the circulator, so that isolation characteristics of the isolator prevent the local oscillator signal from being radiated as spurious emissions from the antenna. The isolator is a device which allows signals to pass in one desired direction but prohibits the signals from passing in the opposite direction.

In another preferable form of the invention, the aforementioned receiver circuit further includes an attenuator for attenuating and conveying the received signal to the even harmonic mixer, the attenuator being provided in a following stage of the circulator.

According to this configuration, the receiver circuit includes an attenuator connected in the following stage of the circulator, so that isolation characteristics of the attenuator prevent the local oscillator signal from being radiated as spurious emissions from the antenna.

In still another preferable form of the invention, the aforementioned receiver circuit further includes a filter for removing an image frequency component, the filter being provided in a preceding stage of the even harmonic mixer.

According to this configuration, the receiver circuit includes a filter connected in the preceding stage of the even harmonic mixer, so that an image frequency component which acts as noise is removed.

In yet another preferable form of the invention, the antenna uses a waveguide as a microwave circuit interface.

In this configuration using a waveguide as a microwave circuit interface, the frequency of the local oscillator signal is lower than frequencies which can be conveyed by the waveguide due to frequency characteristics thereof, so that the local oscillator signal is blocked by the waveguide. As a consequence, the waveguide, if used as a microwave circuit interface, can prevent the local oscillator signal from being radiated as spurious emissions from the antenna.

These and other objects, features and advantages of the invention will become more apparent upon reading the following detailed description in conjunction with the accompanying drawings.

DETAILED DESCRIPTION OF THE
PREFERRED EMBODIMENTS OF THE
INVENTION

The invention is now described, by way of specific example, with reference to the accompanying drawings.

Figure 1:
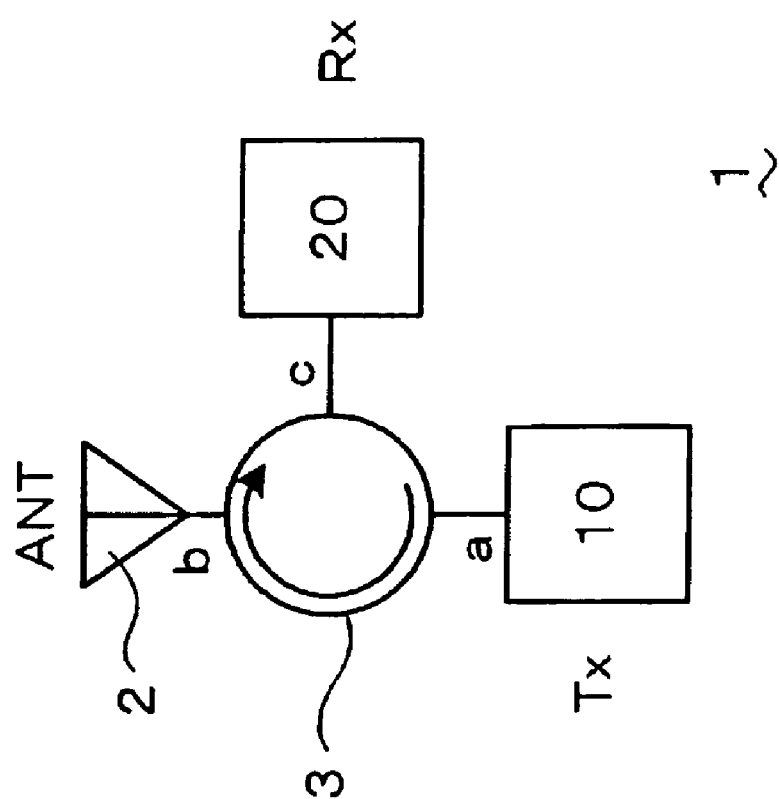
FIG. 1 is a block diagram of the radar according to a preferred embodiment of the invention.
Figure 2:
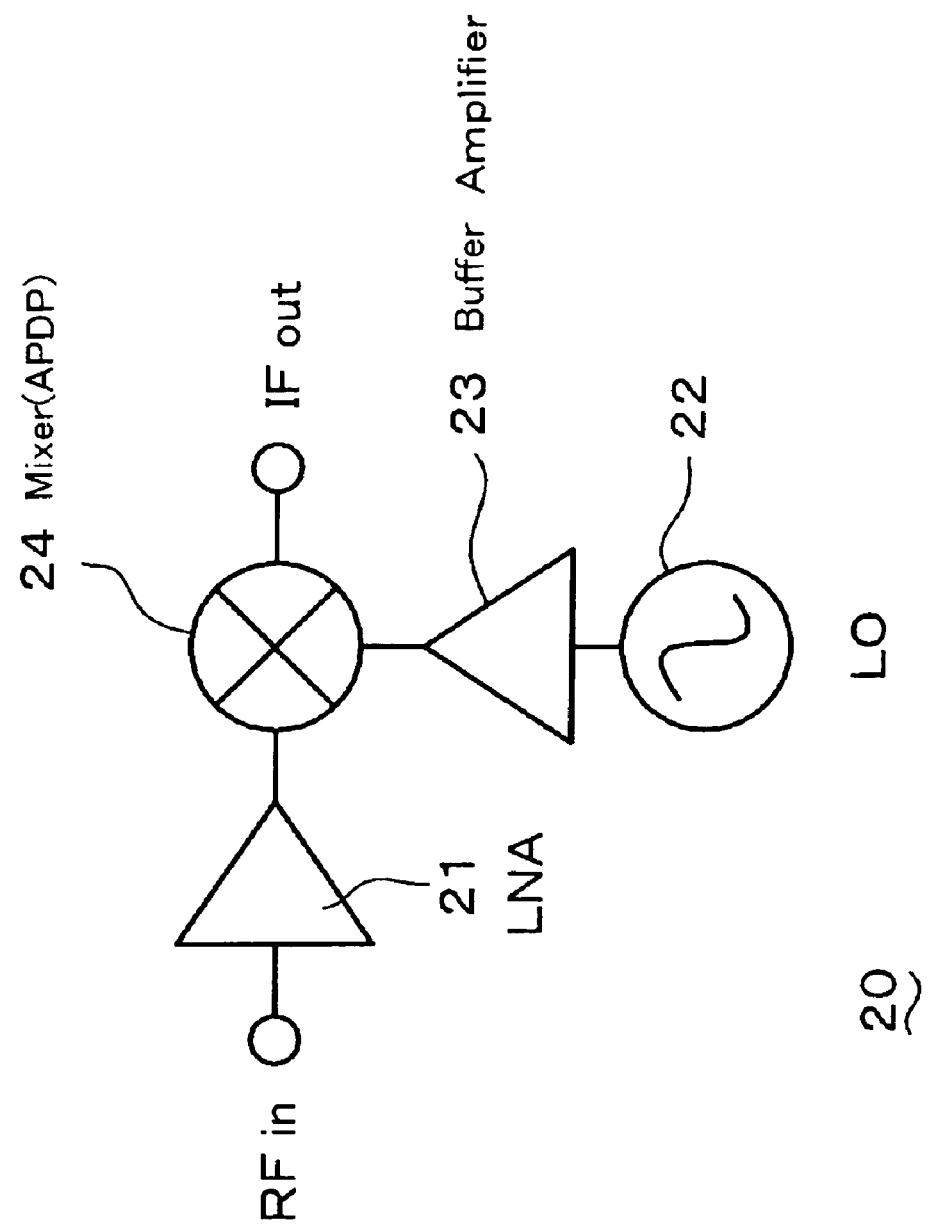
FIG. 2 is a block diagram of a receiver circuit of the radar of FIG. 1.
Figure 3:
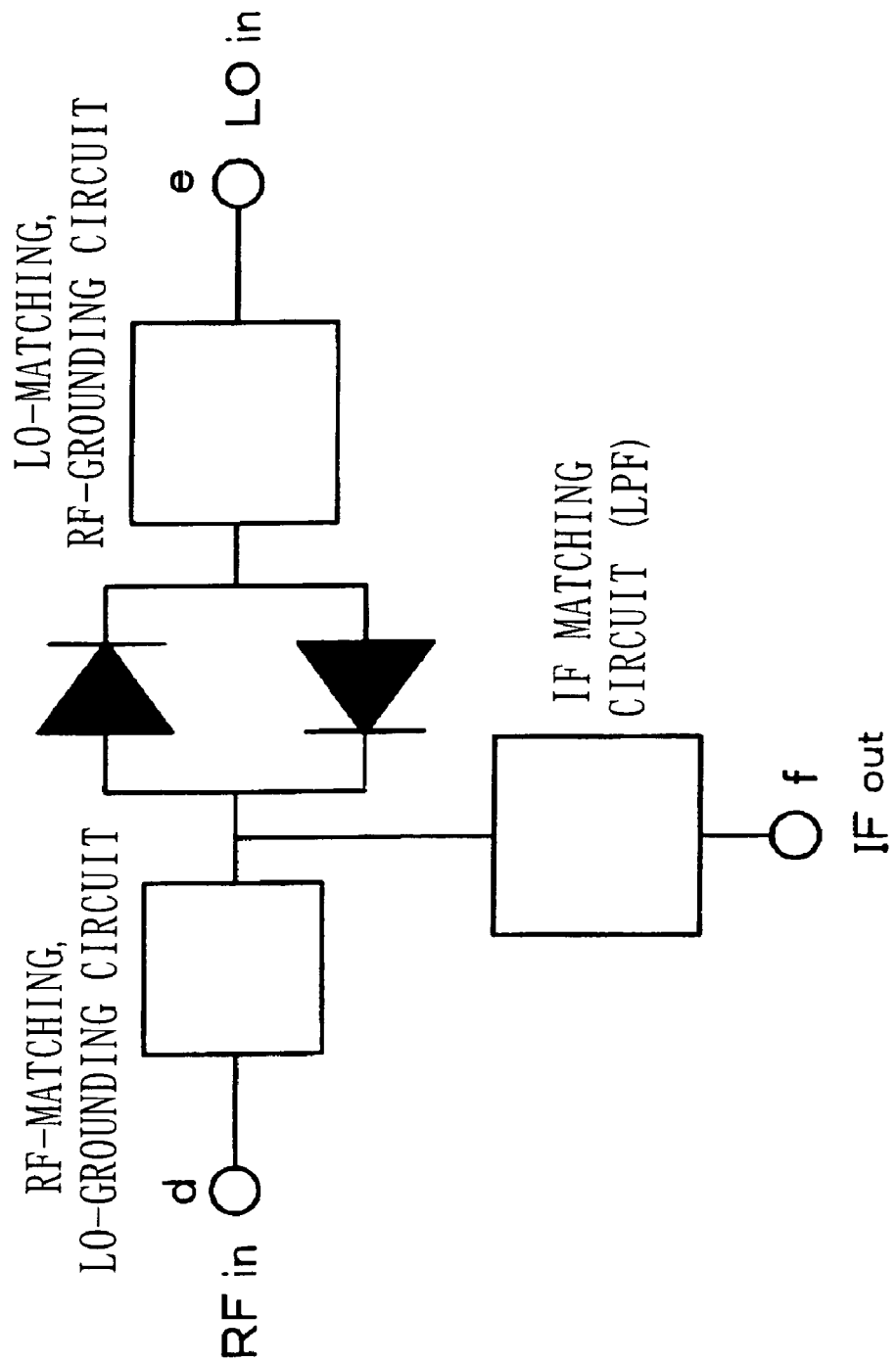
FIG. 3 is a block diagram of an even harmonic mixer used in the receiver circuit of the radar of FIG. 1.

FIGS. 1–3 show a radar 1 and principal portions thereof according to a preferred embodiment of the invention, in which FIG. 1 is a block diagram of the radar 1 of the embodiment, FIG. 2 is a block diagram of a receiver circuit 20 of the radar 1, and FIG. 3 is a block diagram of an even harmonic mixer 24 used in the receiver circuit 20 of the radar 1 of the embodiment.

As shown in FIG. 1, the radar 1 includes a transmitter circuit 10, the aforementioned receiver circuit 20, an antenna 2 and a circulator 3.

In this radar 1 of the embodiment, a transmit signal generated by the transmitter circuit 10 is sent to the antenna 2 through the circulator 3 and the antenna 2 emits a beam of radio waves. A portion of the radio waves reflected by a target and received by the antenna 2. The antenna 2 delivers a resultant received signal RF to the receiver circuit 20.

The circulator 3 has a terminal a connected to the transmitter circuit 10, a terminal b connected to the antenna 2, and a terminal c connected to the receiver circuit 20. The circulator 3 allows signals to pass through in directions from the terminal a to the terminal b, from the terminal b to the terminal c, and from the terminal c to the terminal a, but blocks any signals flowing in opposite directions.

Referring to FIG. 2, the receiver circuit 20 includes a low-noise amplifier 21, a local oscillator 22, a buffer amplifier 23 and an even harmonic mixer 24.

The low-noise amplifier 21 amplifies the received signal RF fed into the receiver circuit 20 at a high signal-to-noise (SN) ratio. The low-noise amplifier 21 delivers the amplified received signal RF to the even harmonic mixer 24.

The local oscillator 22 generates a local oscillator signal LO and supplies the same to the buffer amplifier 23 which will be later described. Assuming that the local oscillator signal LO has a frequency fLO, the received signal RF has a frequency fRF and an intermediate frequency signal IF has a frequency fIF, the frequency fLO of the local oscillator signal LO is expressed by fLO=(fRF−fIF)/2. This means that the frequency fLO of the local oscillator signal LO is approximately half the frequency fRF of the received signal RF.

The buffer amplifier 23 is for amplifying the local oscillator signal LO fed from the local oscillator 22. The buffer amplifier 23 supplies the amplified local oscillator signal LO to the even harmonic mixer 24.

The even harmonic mixer 24 incorporates an anti-parallel diode pair made up of two diodes which are connected in parallel but in opposite directions (reverse polarities) as shown in FIG. 3. The even harmonic mixer 24 thus configured is for converting the received signal RF into the intermediate frequency signal IF with the local oscillator signal LO. The even harmonic mixer 24 has a terminal d (RF port) connected to the low-noise amplifier 21, a terminal e (LO port) connected to the buffer amplifier 23, and a terminal f (IF port). The even harmonic mixer 24 mixes the amplified received signal RF fed from the low-noise amplifier 21 through the terminal d and the amplified local oscillator signal LO fed from the buffer amplifier 23 through the terminal e to generate the aforementioned intermediate frequency signal IF, which is output from the terminal f.

Although not specifically shown in FIG. 3, it is preferable that a filter for image rejection be inserted between the low-noise amplifier 21 and the even harmonic mixer 24. This image rejection filter is a filter for removing an image frequency component which exists on an opposite side of a wanted component of the received signal with respect to the intermediate frequency fIF, where the difference between the image frequency and the intermediate frequency fIF equals the difference between the frequency fRF of the wanted received signal component and the intermediate frequency fIF. This means that the image frequency, expressed by |fRF−LO|, equals the intermediate frequency fIF. If the image frequency is admitted to the even harmonic mixer 24, components containing no information (true signal) would be added to intermediate frequency component and enter the even harmonic mixer 24 as noise. Such an image frequency component can be removed if an image rejection filter having an attenuation band capable of eliminating a frequency of ½fLO is inserted between the low-noise amplifier 21 and the even harmonic mixer 24.

Figure 4:
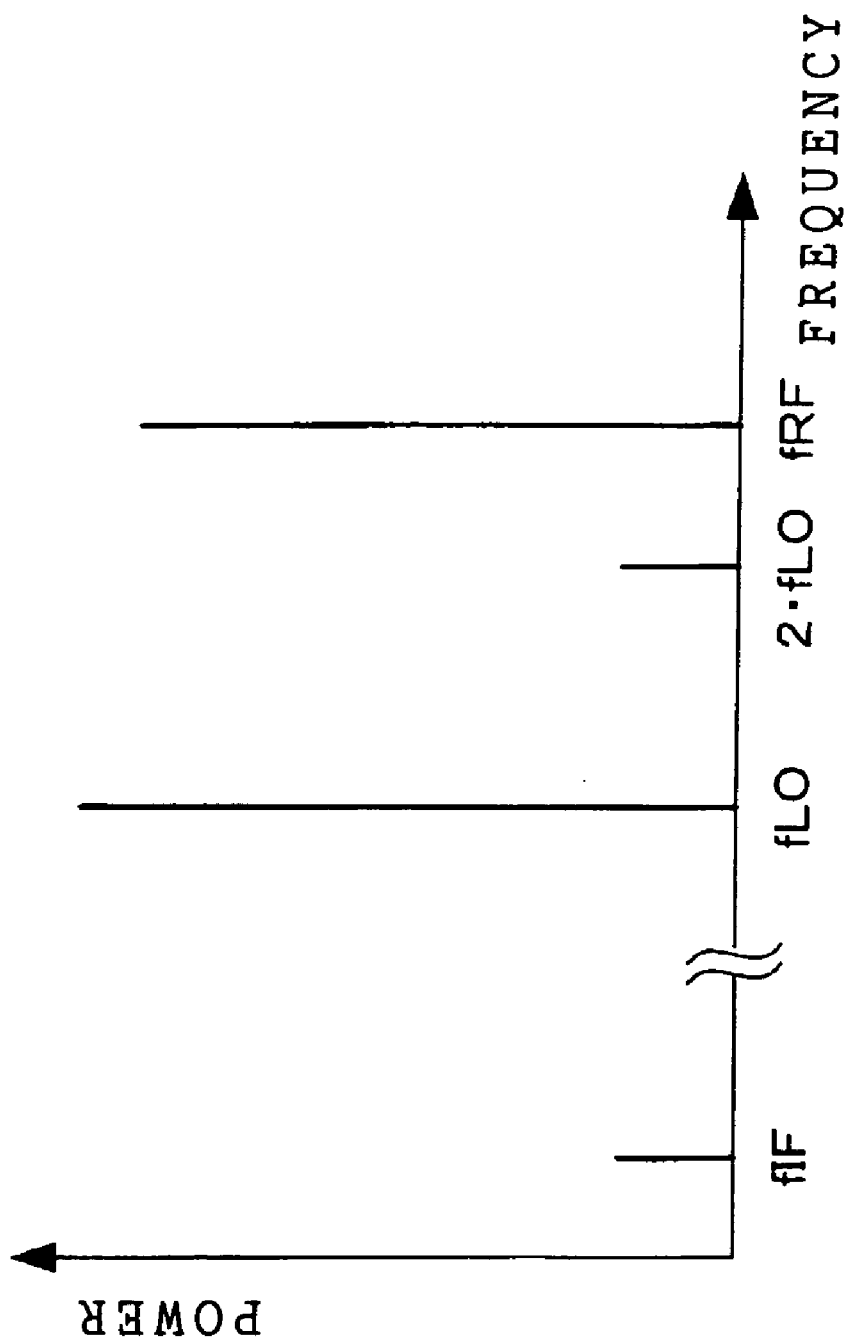
FIG. 4 is a diagram showing a frequency spectrum of a signal observed at a terminal (RF port) of the even harmonic mixer in the radar of FIG. 1.

FIG. 4 is a diagram showing a frequency spectrum of the amplified received signal RF observed at the terminal d (RF port) of the even harmonic mixer 24 in the radar 1 of the present embodiment. The even harmonic mixer 24 is excited when the frequency fLO of the local oscillator signal LO is approximately half the frequency fRF of the received signal RF. Therefore, if the two diodes of the even harmonic mixer 24 are perfectly balanced, a component of frequency 2fLO which is an apparent local oscillator frequency component is substantially suppressed as shown in FIG. 4.

Now, operation of the even harmonic mixer 24 is described. Referring to FIG. 3, currents $i_1$ and $i_2$ that flow through the individual diodes of the even harmonic mixer 24 are expressed by equations (1) below:

$$i_1 = -I_s(e^{-\alpha v} - 1)$$
$$i_2 = I_s(e^{\alpha v} - 1) \quad (1)$$

Thus, the conductances of the individual diodes are expressed by equations (2) below:

$$g_1 = \frac{di_1}{dV} = \alpha I_s e^{-\alpha V}$$
$$g_2 = \frac{di_2}{dV} = \alpha I_s e^{\alpha V} \quad (2)$$

From equations (2) above, the combined conductance of the two diodes is given by equation (3) below:

$$g = g_1 + g_2 = \alpha I_s(e^{-\alpha v} + e^{\alpha v}) = 2\alpha I_s \cosh(\alpha V) \quad (3)$$

The combined conductance of the two diodes can be rewritten in the form of a modified Bessel function as shown below:

$$V = V_{LO}\cos\omega_{LO}t \quad (4)$$

$$g = 2\alpha I_s \cosh(\alpha V_{LO}\cos\omega_{LO}t)$$
$$= 2\alpha i[I_0(\alpha V_{LO}) + 2I_2(\alpha V_{LO})\cos 2\omega_{LO}t + \ldots]$$

Then, given the voltage of the amplified received signal RF (RF IN signal), $V = V_s \cos \omega_s t$, output current i of the even harmonic mixer 24 is expressed by equation (5) below:

$$i = gV \quad (5)$$
$$= g(V_{LO}\cos\omega_{LO}t + V_s\cos\omega_s t)$$
$$= A\cos\omega_{LO}t + B\cos\omega_s t + C\cos 3\omega_{LO}t + D\cos 5\omega_{LO}t +$$
$$E\cos(2\omega_{LO} - \omega_s)t + F\cos(2\omega_{LO} - \omega_s)t + \ldots$$

Here, the apparent local oscillator frequency component is expressed as $$V_{LO} \cos 2\omega_{LO}t \quad (6)$$

It can be seen from equation (5) above that the output current i of the even harmonic mixer 24 contains odd order terms only. Hence, it is understood that the apparent local oscillator frequency component is substantially suppressed and not output from the even harmonic mixer 24.

Figure 5:
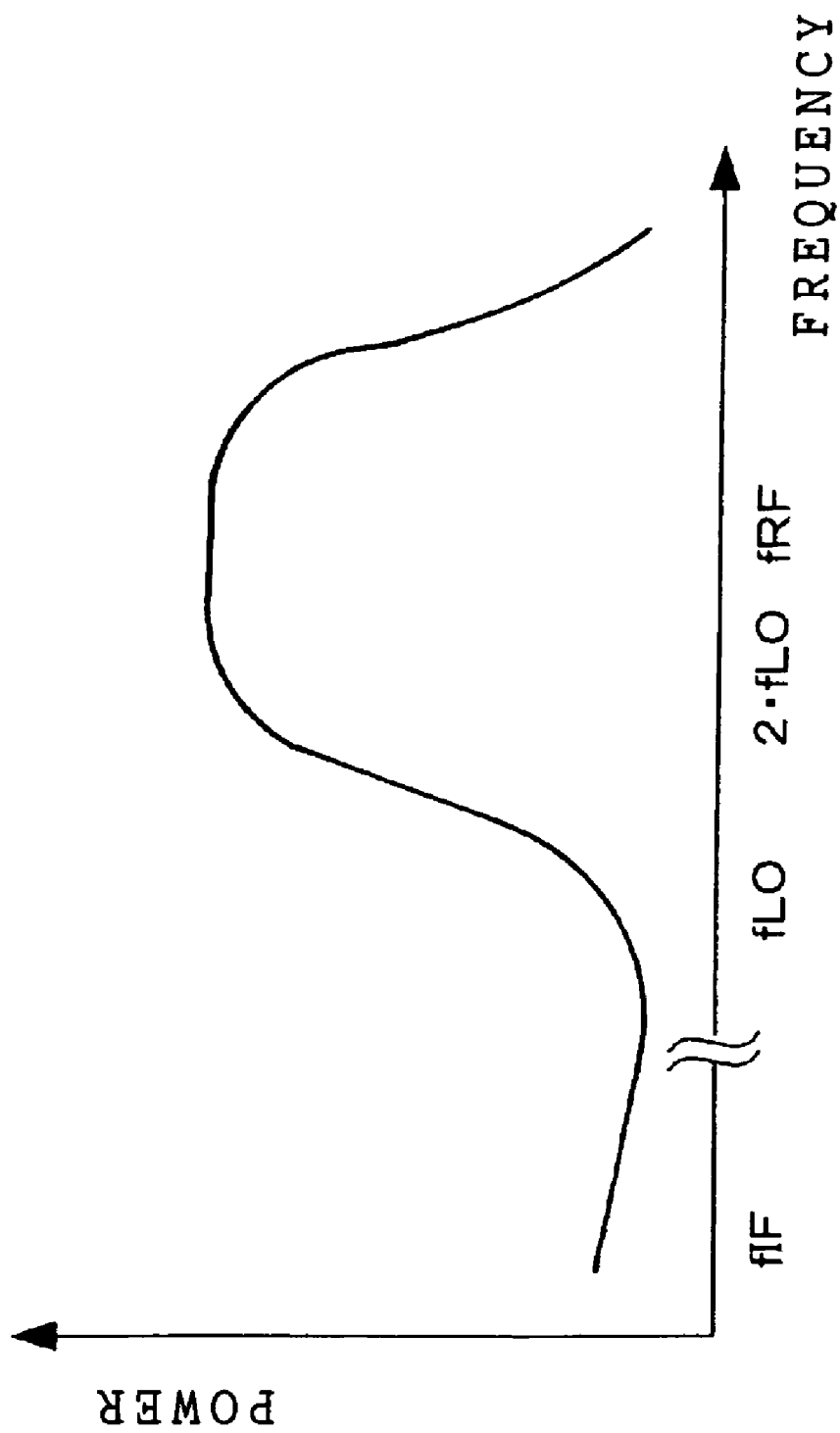
FIG. 5 is a diagram showing isolation characteristics of a low-noise amplifier and a buffer amplifier used in the radar of FIG. 1.

Referring now to FIG. 5, isolation characteristics provided by the low-noise amplifier 21 and the buffer amplifier 23 of the radar 1 of the present embodiment are described.

FIG. 5 is a diagram showing the isolation characteristics of the low-noise amplifier 21 and the buffer amplifier 23 used in the radar 1 of the embodiment. The low-noise amplifier 21 and the buffer amplifier 23 each allow signals to pass in one direction but isolate a preceding circuit from effects of a preceding circuit. Specifically, the frequency fLO of the local oscillator signal LO falls within an isolation range of the low-noise amplifier 21, so that the low-noise amplifier 21 prevents spurious emissions at the frequency fLO. On the other hand, the frequency fRF of the received signal RF which is twice as high as the frequency fLO of the local oscillator signal LO falls within an isolation range of the buffer amplifier 23 and, therefore, pulling of the frequency fLO of the local oscillator signal LO due to a change in load impedance of the even harmonic mixer 24 which occurs when a high-power received signal is input is substantially decreased by the isolation characteristics of the buffer amplifier 23.

Figure 6:
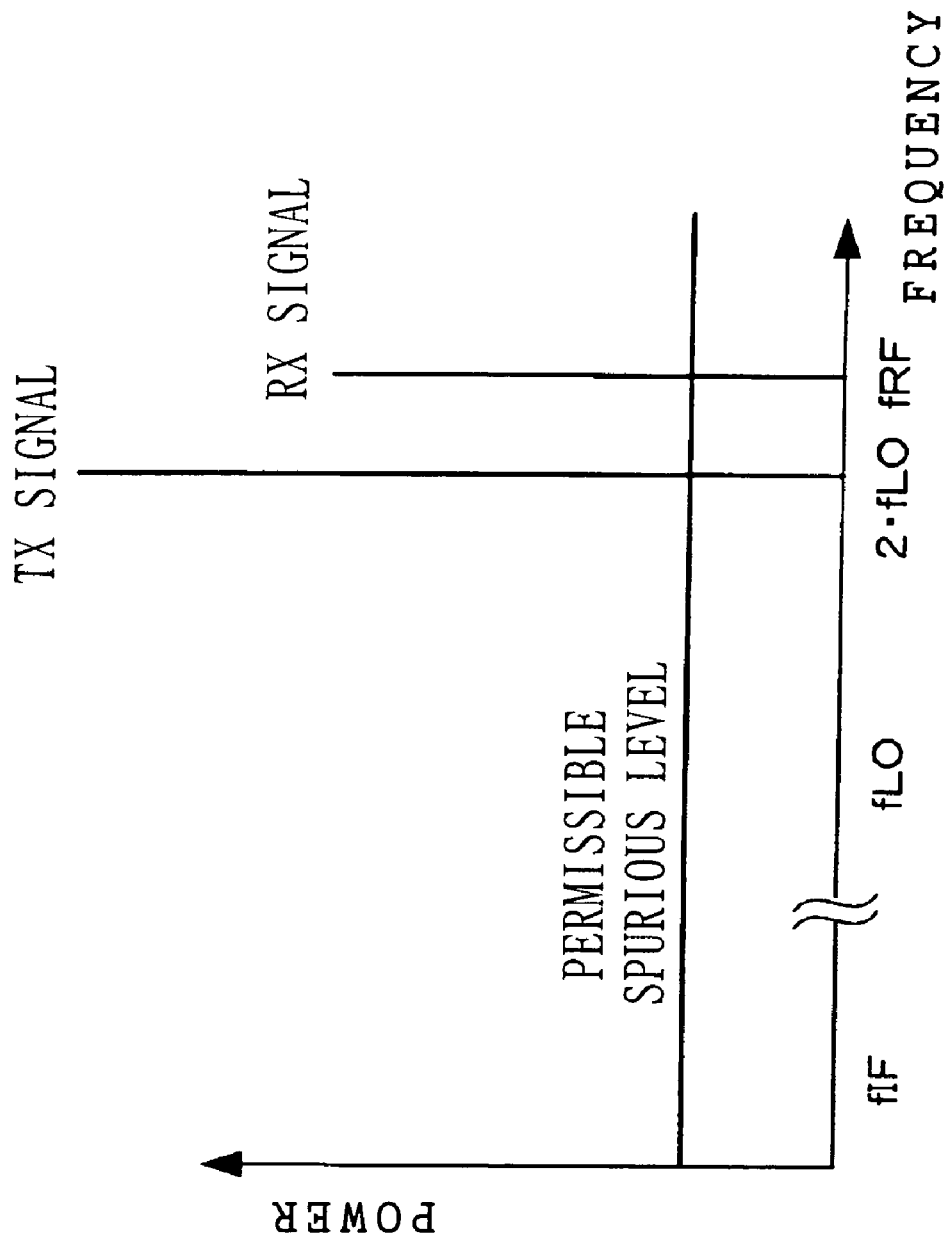
FIG. 6 is a diagram showing a frequency spectrum observed at an antenna of the radar of FIG. 1.
Figure 7:
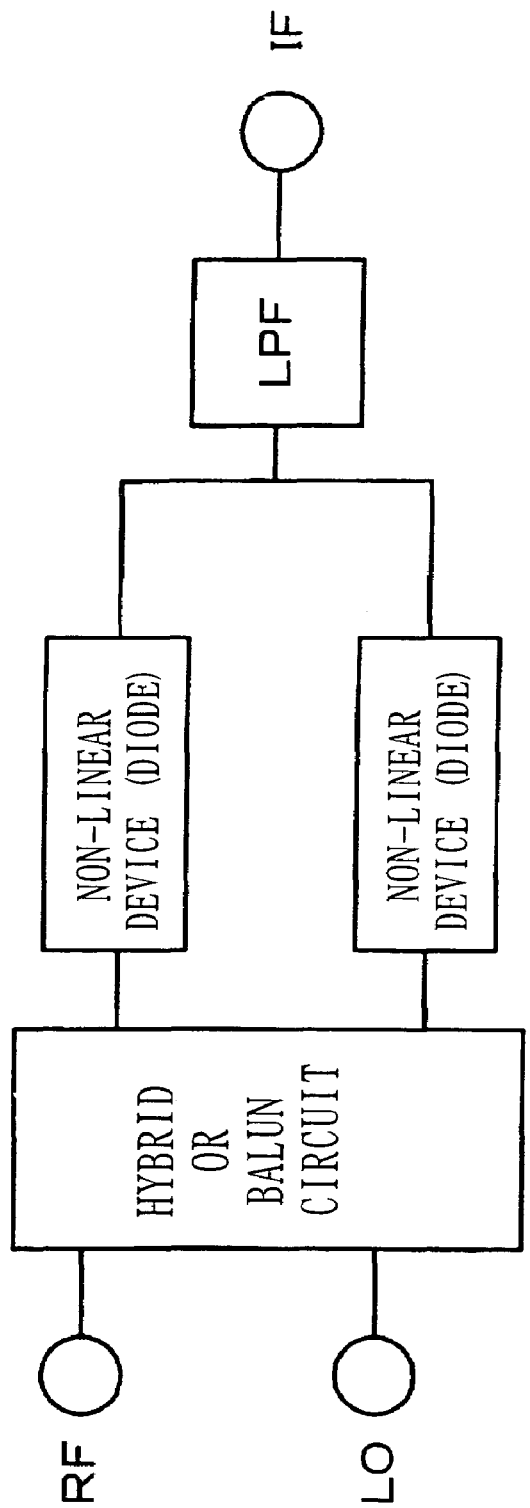
FIG. 7 is a block diagram showing an example of a fundamental wave mixer used in a receiver circuit of a conventional radar.

FIG. 6 is a diagram showing a frequency spectrum observed at the antenna 2 of the radar 1 of the embodiment. As can be recognized from FIG. 1, the local oscillator signal LO which may leak from the receiver circuit 20 passes to the antenna 2 through the circulator 3. The frequency fLO of this leaked signal component is however approximately half of operating frequencies of the circulator 3 and the antenna 2, so that spurious emissions from the antenna 2 due to leakage of the local oscillator signal LO are completely suppressed as shown in FIG. 6.

The radar 1 of the embodiment employs the even harmonic mixer 24 incorporating the anti-parallel diode pair as a frequency converter as thus far discussed, and the frequency fLO of the local oscillator signal LO is approximately half the frequency fRF of the received signal RF. Therefore, if the two diodes of the even harmonic mixer 24 are perfectly balanced, the local oscillator signal LO will not leak from the even harmonic mixer 24. Additionally, the antenna 2 has such frequency characteristics that make it possible to prevent spurious emissions caused by leakage of the local oscillator signal LO, if any.

In this embodiment, the buffer amplifier 23 is provided in a following stage of the local oscillator 22 (FIG. 2). In this configuration, the isolation characteristics of the buffer amplifier 23 prevent pulling of the frequency fLO of the local oscillator signal LO due to a change in impedance of the even harmonic mixer 24 which occurs when a high-power received signal is input into the even harmonic mixer 24.

Also, the low-noise amplifier 21 is provided in a following stage of the circulator 3 (FIG. 2). In this configuration, the isolation characteristics of the low-noise amplifier 21 prevent the local oscillator signal LO from being radiated as spurious emissions from the antenna 2.

While the invention has thus far been described with reference to the preferred embodiment thereof, the invention is not limited thereto but may be practiced in various forms within the scope of the appended claims, otherwise than specifically discussed heretofore.

For example, although the radar 1 includes the low-noise amplifier 21 in the foregoing embodiment, the radar 1 may be modified not to include any low-noise amplifier. In this modified form of the embodiment, it is possible to prevent the local oscillator signal LO from being radiated as spurious emissions from the antenna 2 by the frequency characteristics of the antenna 2 itself.

Also, although the radar 1 includes the low-noise amplifier 21 in the foregoing embodiment, the radar 1 may be modified to employ an isolator or an attenuator having appropriate isolation characteristics instead of the low-noise amplifier 21, where the isolator is a device which allows signals to pass in one desired direction but prohibits the signals from passing in the opposite direction. In this modified form of the embodiment, it is possible to prevent the local oscillator signal LO from being radiated as spurious emissions from the antenna 2 by the isolation characteristics of the isolator or the attenuator.

Furthermore, the antenna 2 of the foregoing embodiment may use a waveguide as a microwave circuit interface. In this configuration, the frequency fLO of the local oscillator signal LO is lower than frequencies which can be conveyed by the waveguide due to frequency characteristics thereof, so that the local oscillator signal LO is blocked by the waveguide. Thus, the waveguide, if used as a microwave circuit interface, can prevent the local oscillator signal LO from being radiated as spurious emissions from the antenna 2 more effectively.

What is claimed is:

1. A radar comprising:
   a transmitter circuit for generating a transmit signal;
   a receiver circuit for receiving a received signal;
   an antenna for radiating radio waves produced from the transmit signal and receiving a portion of the radio waves; and
   a circulator for conveying the transmit signal supplied from said transmitter circuit to said antenna and for conveying the received signal fed from said antenna to said receiver circuit;
   wherein said receiver circuit includes:
      a local oscillator for generating a local oscillator signal;
      a buffer amplifier for amplifying the local oscillator signal output from said local oscillator; and
      an even harmonic mixer for mixing the received signal with the local oscillator signal fed through said buffer amplifier, said even harmonic mixer including an anti-parallel diode pair.

2. The radar according to claim 1, wherein said receiver circuit further includes a low-noise amplifier for amplifying the received signal and delivering the amplified received signal to said even harmonic mixer, said low-noise amplifier being provided in a following stage of said circulator.

3. The radar according to claim 1, wherein said receiver circuit further includes an isolator for conveying the received signal to said even harmonic mixer, said isolator being provided in a following stage of said circulator.

4. The radar according to claim 1, wherein said receiver circuit further includes an attenuator for attenuating and conveying the received signal to said even harmonic mixer, said attenuator being provided in a following stage of said circulator.

5. The radar according to one of claims 1 to 4, wherein said receiver circuit further includes a filter for removing an image frequency component, said filter being provided in a preceding stage of said even harmonic mixer.

6. The radar according to one of claims 1 to 5, wherein said antenna uses a waveguide as a microwave circuit interface.

* * * * *